Aug. 2, 1938.                B. L. PETERSON                2,125,311
           WATER SUPPLY AND DRAINAGE SYSTEM FOR FISHLOCKS
                     Filed May 25, 1937       6 Sheets-Sheet 1
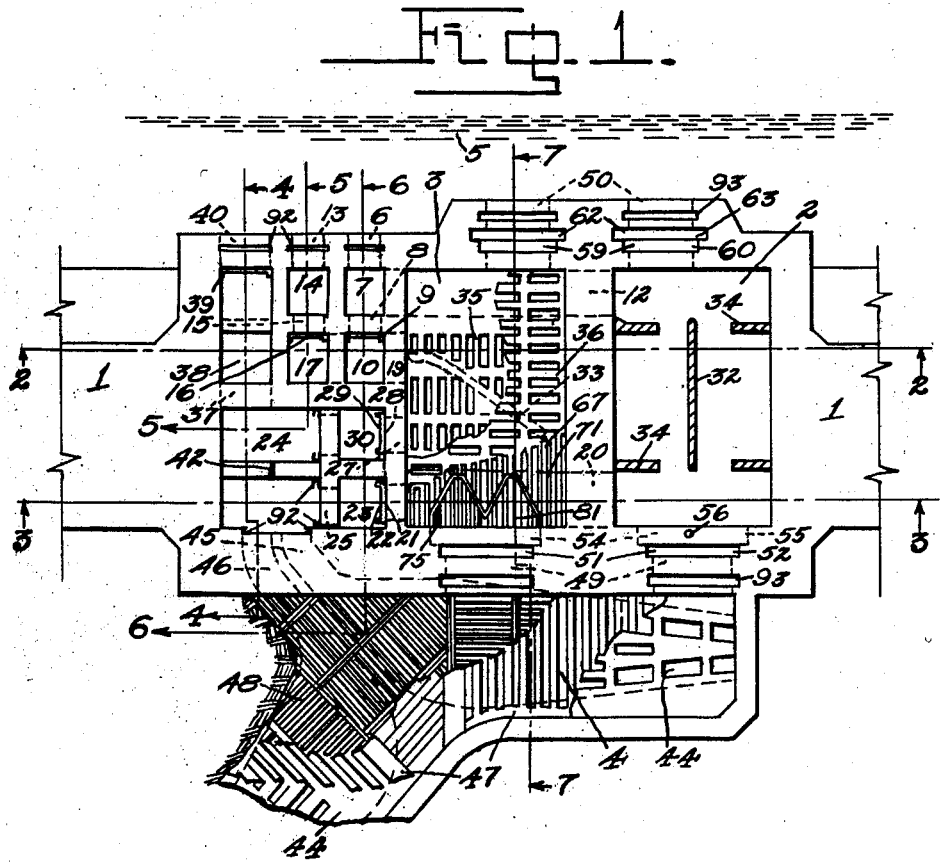
INVENTOR
Ben L. Peterson
BY
ATTORNEY

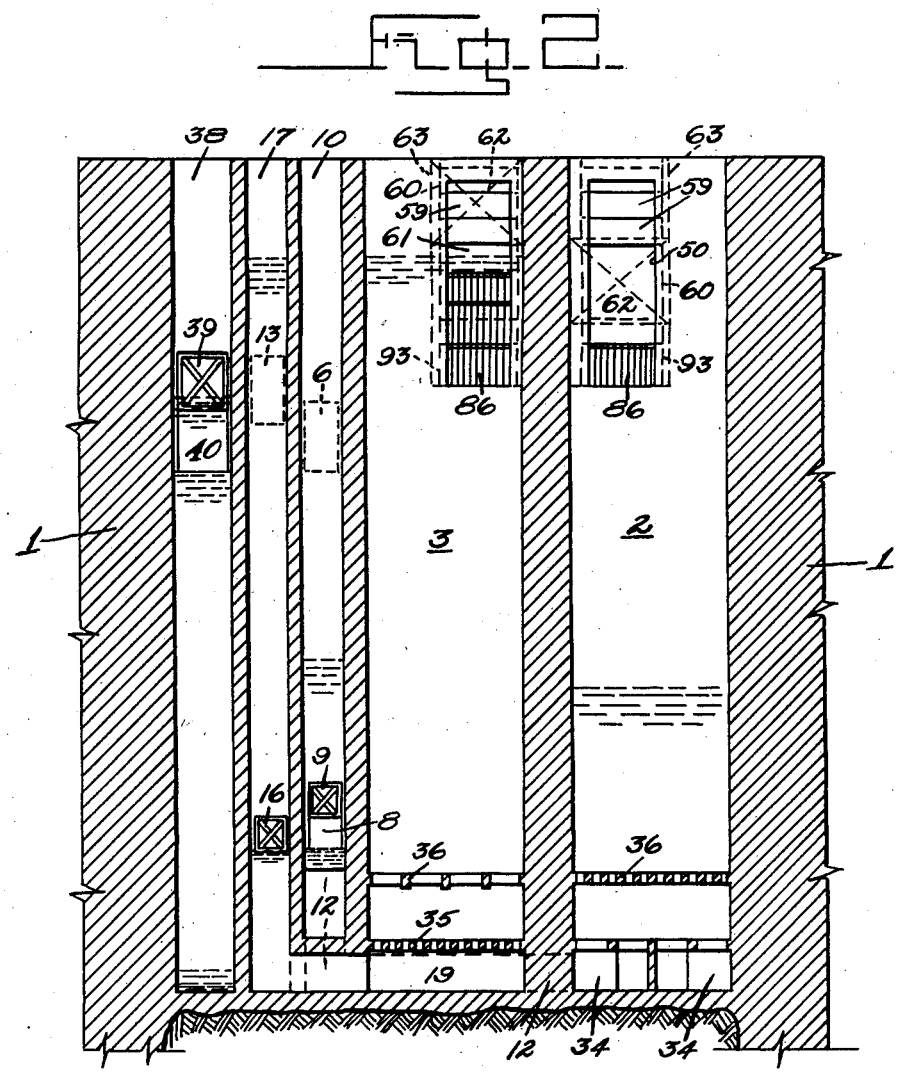

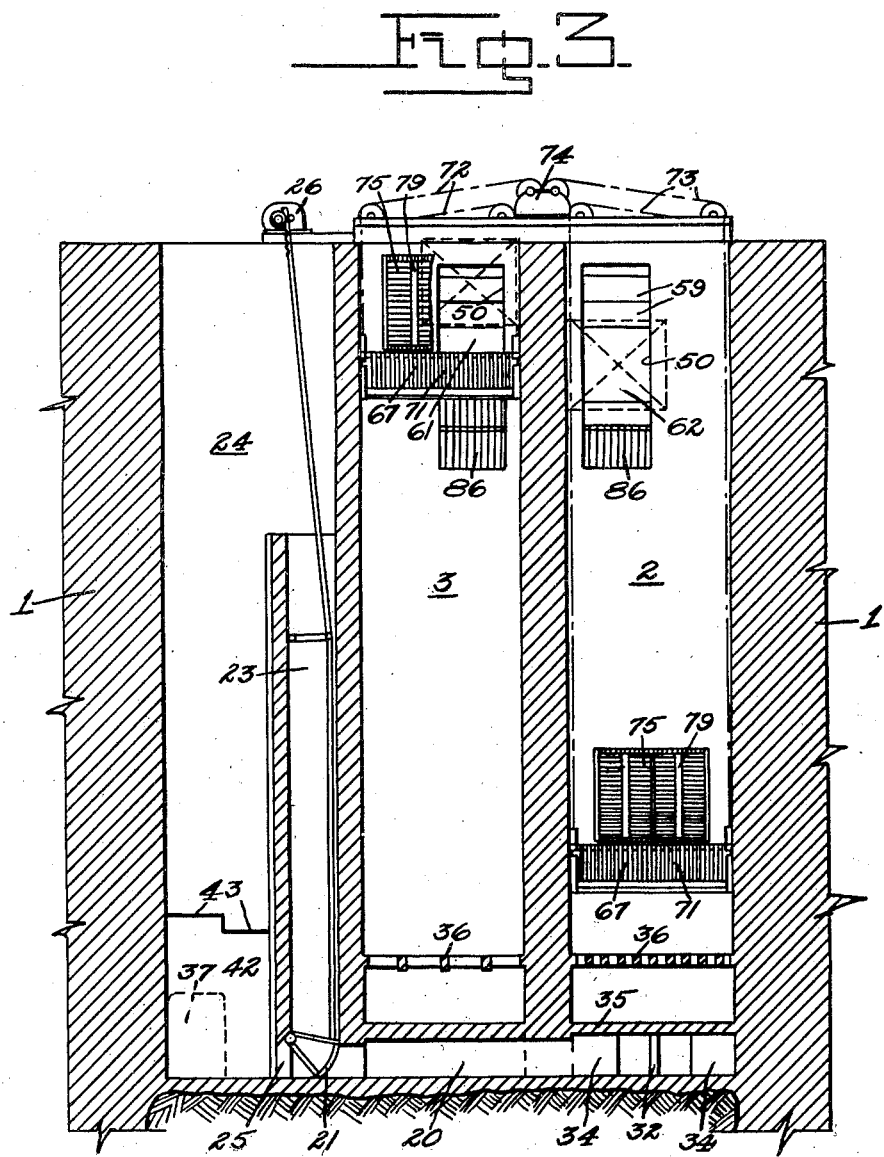

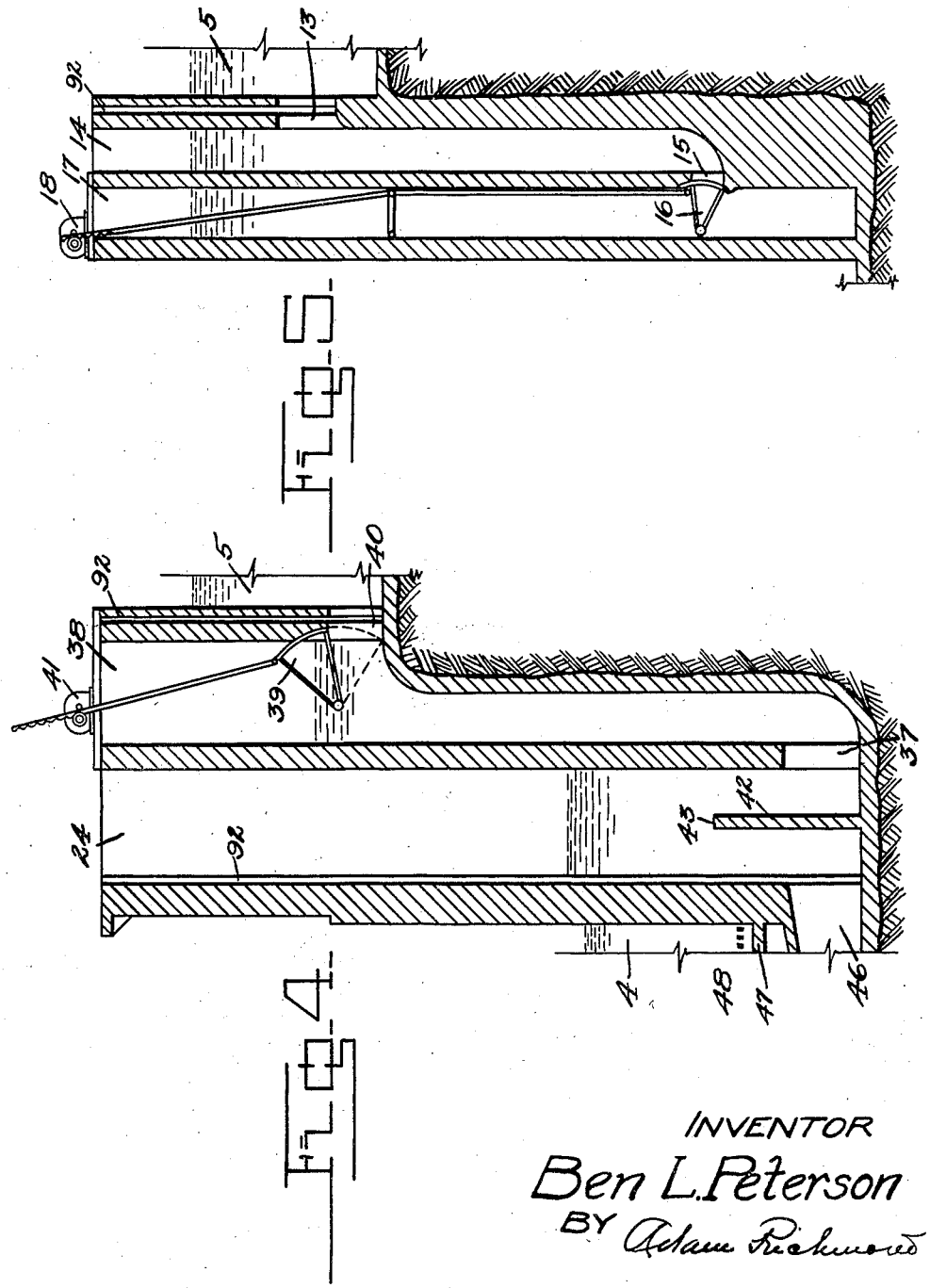

Aug. 2, 1938.  B. L. PETERSON  2,125,311
WATER SUPPLY AND DRAINAGE SYSTEM FOR FISHLOCKS
Filed May 25, 1937  6 Sheets-Sheet 5
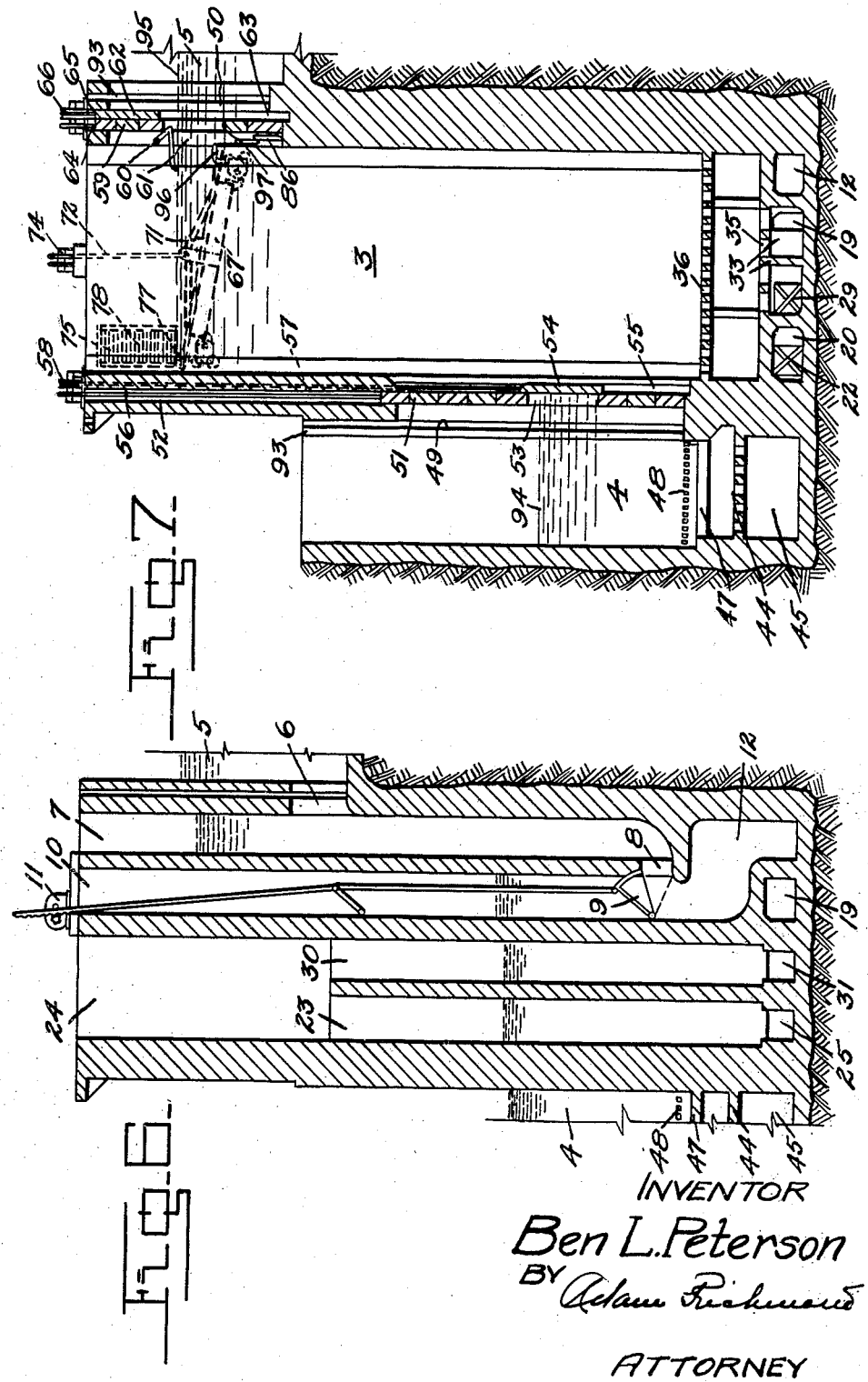
INVENTOR
Ben L. Peterson
BY Adam Richmond
ATTORNEY Aug. 2, 1938.   B. L. PETERSON   2,125,311
WATER SUPPLY AND DRAINAGE SYSTEM FOR FISHLOCKS
Filed May 25, 1937   6 Sheets-Sheet 6
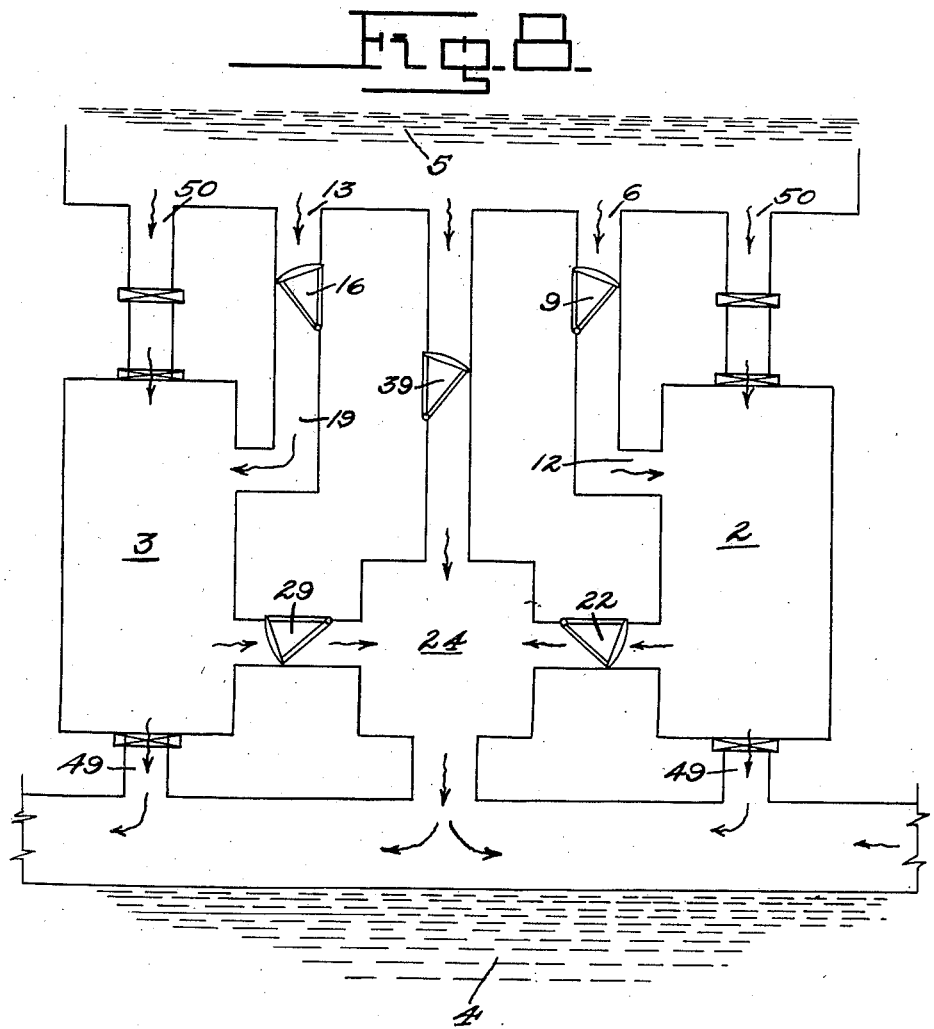
INVENTOR
*Ben L. Peterson*
BY
*Adam Richmond*
ATTORNEY Patented Aug. 2, 1938

2,125,311

UNITED STATES PATENT OFFICE 2,125,311

WATER SUPPLY AND DRAINAGE SYSTEM FOR FISHLOCKS

Ben L. Peterson, Portland, Oreg., assignor to the Government of the United States of America, represented by the Secretary of War Application May 25, 1937, Serial No. 144,612

9 Claims. (Cl. 61—21)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a fish lock construction of the type illustrated in the application filed June 2, 1937, by Harlan B. Holmes, Henry Blood and Milo C. Bell, Serial No. 146,016, for a Method and apparatus for transferring migratory fish over a dam structure, and more especially this invention is directed to an apparatus for watering and unwatering fish locks.

One object of this invention is to provide a system and apparatus wherein a fish lock may be suitably watered and the discharge water from the lock directed into an auxiliary water reservoir from which it may be distributed to a point remote from the locks.

Another object of this invention is to provide a system and apparatus wherein a pair of fish locks are suitably watered and the discharge water from the locks directed into an auxiliary water reservoir common to the two locks, from which it may be distributed to any suitable point.

Another object of this invention is to provide a dam construction having a forebay and a tailrace, a plurality of fish locks arranged in the dam, an auxiliary water reservoir within the dam, a plurality of gate controlled portals disposed one between each of the fish locks and the forebay at the level of the forebay, a plurality of second gate controlled portals disposed one between each of the fish locks and the auxiliary water reservoir and means for directing the water from the auxiliary reservoir.

Other objects of this invention are to provide means whereby fish may be locked through considerable heights without being subjected to deleterious fluctuations of water pressure; to provide means for controlling the flow of water used to lure the fish into the fish locks, and finally to provide a system and apparatus wherein undesirable cross-currents and eddies are eliminated from the water supplied to the fish locks.

With these and other objects in view this invention consists in certain novel details of construction, combination and arrangement of parts to be more particularly hereinafter described and claimed.

With reference to the accompanying drawings in which corresponding parts are indicated by similar reference characters:

Fig. 1 is a fragmentary plan view partly in section of the preferred embodiment of the invention shown in connection with a dam structure having relatively greater variations in tailrace and forebay elevations. In this view operating mechanisms, walkways and the like have been omitted to clarify the design of the structure;

Fig. 2 is a longitudinal section taken on the line 2—2 of Fig. 1;

Fig. 3 is a similar view taken on the line 3—3 of Fig. 1;

Fig. 4 is a transverse vertical section taken on the line 4—4 of Fig. 1, and looking in the direction of the arrows;

Fig. 5 is a similar section taken on the line 5—5 of Fig. 1;

Fig. 6 is a similar view taken on the line 6—6 of Fig. 1;

Fig. 7 is a similar view taken on the line 7—7 of Fig. 1; and

Fig. 8 is a diagrammatic view showing the various valve controlled conduits for watering and unwatering the locks and an auxiliary water reservoir into which the locks are discharging; the reservoir for the sake of convenience being disclosed between the two locks, instead of in its normal position, as shown in Fig. 1 of the drawings.

In the illustrated embodiment characterizing this invention, there is shown a dam structure (1), including a plurality of fish locks, here shown as two in number, (2) and (3) which are suitably arranged in gate controlled communication with an entry bay (4) and a forebay (5).

The fish locks (2) and (3) are each provided with suitable water supply means. For the fish lock (2), water from the forebay (5) is admitted through an aperture (6) to a well (7) having a portal (8) at its bottom. A tainter valve (9) located in tainter valve pit (10) adjacent to well (7), controls the portal (8). The tainter valve (9) is actuated by suitable means as mechanism (11). A conduit (12) effects open communication between the tainter valve pit (10) and the lock (2). This condition is best disclosed in Figure 7, wherein the tainter valve (9) is shown in opened position.

For the fish lock (3), water from the forebay (5) is admitted through an aperture (13) to a well (14) having a portal (15) at its bottom. A tainter valve (16) located in tainter valve pit (17) adjacent to the well (14), controls the portal (15). The tainter valve (16) is actuated by suitable means as mechanism (18). A conduit (19) effects open communication between the tainter valve pit (17) and the lock (3). This apparatus is best disclosed in Figure 6, wherein the tainter valve (16) is shown in closed position.

The fish locks (2) and (3) are each provided with suitable drainage means. For the fish lock (2), water therefrom may pass through a conduit (20) to a portal (21). A tainter valve (22) mounted in a tainter valve pit (23) controls the portal (21). A well (24) is in open communication with the tainter valve pit (23) via opening (25). The tainter valve (22) is actuated by suitable means as mechanism (26). This apparatus is best disclosed in Fig. 3, wherein the tainter valve (22) is shown in closed position.

For the fish lock (3), water therefrom may pass through a conduit (27) to a portal (28). A tainter valve (29), mounted in a tainter valve pit (30), controls the portal (28). The tainter valve pit (30) is in open communication with the well (24) via opening (31).

The flow of water into the fish locks (2) and (3) is suitably distributed and diffused to avoid the formation of objectionable eddies or cross-currents. The primary flow into the fish locks is distributed by a suitable diversion wall, shown as (32) in the fish lock (2) and (33) in the fish lock (3). Suitable baffles (34) may be used to further distribute the water.

It is to be noted, that while the diversion walls (32) and (33) are not symmetrical in the structure shown in Figure 1, this divergence is a matter of structural limitation only, and is not to be construed as being necessary to the functioning of the invention.

Apertured partitions (35) are disposed in a substantially horizontal plane across each of the fish locks at an elevation slightly above that of the water inlet conduits, (12) and (19). Other apertured partitions (36), substantially parallel to and spaced apart from the partitions (35) are likewise disposed across each of the fish locks above the partitions (35). The apertured partitions (35) and (36) are effective in adequately diffusing the water flow into the fish locks, minimizing eddies and cross-currents.

The well (24) in addition to receiving water discharged from the fish locks (2) and (3), via the openings (25) and (31), also receives water directly from the forebay (5). Aperture (37), located at the lower portion of the well (34), provides communication with adjacent tainter valve pit (38). A tainter valve (39) is disposed in the tainter valve pit (38) and in controlling juxta-position with aperture (40) leading to the forebay (5). The tainter valve (39) is suitably actuated by the mechanism (41). This condition is best shown in Figure 5, in which the tainter valve (39) is shown in opened position.

A baffle (42), disposed transversely through well (24) at a position between the openings (25) and (31), is provided with a stepped crest (43).

The entry bay (4), which is in gate-controlled communication with the fish locks (2) and (3), is preferably an open conduit leading from zone or zones of fish concentration in the tailrace, and provides a channel whereby the fish may readily approach the fish locks. The entry bay is provided with an apertured sub-floor (44), through the openings of which is discharged all of the water flowing through the well (24), via the mutually diverging conduits (45) and (46). The apertured sub-floor (44) has superimposed upon and spaced above it an apertured floor (47). Suitable grillage (48) is disposed above the apertured floor (47). The openings in the grillage (48) are of a size to prevent the passage therethrough of adult fish, though permitting emergence of fingerlings traveling downstream. The structure presented by the mutually diverging conduits (45) and (46), together with the apertured sub-floor (44), the apertured floor (47) and the grillage (48), provides adequate diffusion of water flowing from the well (24), throughout the entry bay (4). The water supplied to the entry bay (4), via the sub-floor (44), the apertured floor (47) and the grillage (48), is discharged into the entry bay (4) at a sufficiently low velocity to present no counter-attraction to fish proceeding to the fish locks (2) and (3).

Each of the fish locks (2) and (3) is equipped with a downstream portal (49), leading from the entry bay (4), and an upstream portal (50), leading to the forebay (5).

The downstream portal (49) is of a height sufficient to encompass the maximum range of tail-water elevations. A plurality of segmental gate units (51), each vertically slidable in grooves (52), is disposed across the portal (49), effectively closing it excepting for an aperture (53). The aperture (53) may be selectively located to register with the prevailing tail-water elevation.

A closure member (54), adequate to close the aperture (53), is located contiguous to the segmental gate units (51), and is vertically slidable in grooves (55).

The segmental gate units (51) may be manipulated as by chain (56), suitably actuated by means, not here shown. The closure member (54) may be operated as by cable (57), suitably actuated as by power operated drum (58).

The upstream portal (50) is of a height sufficient to operatively encompass the maximum range of forebay elevations. A plurality of segmental gate units (59), each vertically slidable in grooves (60), is disposed across the portal (50), effectively closing it excepting for an aperture (61). The aperture (61) may be selectively located to register with the prevailing forebay elevation.

A closure member (52), adequate to close the aperture (61), is located contiguous to the segmental gate units (59), and is vertically slidable in grooves (63). Segmental units (59) may be manipulated as by a chain (64), suitably actuated by means not shown. The closure member (62) may be operated as by cable (65), suitably actuated as by power operated drum (66).

Fish locks (2) and (3) are each equipped with a fish lift (67), the lifts being suspended by means of pairs of cables (72) and (73), each of which is actuated by suitable means as by power driven mechanism (74), permitting selective, independent operation of either of the lifts (67).

Each of the fish locks (2) and (3) has disposed therein a fish trap structure (75), which is vertically movable along the inside face of the downstream wall thereof.

A barrier (86) here shown as telescopic, may be disposed adjacent to and on the fish lock side of the segmental gate units (59).

Having outlined the structural details of this invention, its operation is as follows:

As shown in Figure 1, the entry bay (4), which is the terminus of a suitable collecting means resulting in concentration of migrating fish therein, is provided with an adequate water supply, from the forebay (5) in conjunction with the drainage and operative discharge from the fish locks (2) and (3) via the conduits (45) and (46), to retain the migrating fish therein. If the water supply to the entry bay (4) were limited to the discharges from the fish locks (2) and (3), it would be subjected to wide fluctuations. To maintain a substantially constant flow of water to the entry bay (4), the flow of water from the forebay (5) through the aperture (40) may be controlled by suitable regulation of the tainter valve (39).

It is assumed that the fish lock (2) is in operative position for receiving migrating fish from the entry bay (4), and that the fish lock (3) is in operative position for discharging migrating fish into the forebay (5). Under these conditions a flow of water from the forebay (5), enters the fish lock (2) via aperture (6), the well (7), the portal (8), past the partially opened tainter valve (9), through the tainter valve pit (10), and the conduit (12). Water thus admitted during the interval in which the fish lock (2) is in position for receiving migratory fish is discharged from the fish lock (2) via the opened aperture (53), into the entry bay (4). This discharge is preferably at a rate sufficiently above that of the water supplied by the conduits (45) and (46) to attract the migrating fish from the entry bay (4), into the fish lock (2), via the aperture (79) in the fish trap structure (75), which is disposed in alignment with the aperture (53). Upon reaching the interior of the fish lock (2), the fish are in comparatively quiet water, from which they will normally attempt to escape in their instinctive urge to proceed against definite and appreciable currents of water. Inasmuch as the only avenue of escape would be back through the lane of entry over which they have just traveled, the use of the fish trap structure (75) is required to retain the fish within the fish lock (2).

After a suitable interval, the closure member (54) is manipulated to seal the aperture (53), the tainter valve (9) is further opened and the water level within the fish lock (2) is raised until it coincides with that of the forebay (5). During this operation the fish lift (67) is elevated at a rate substantially equal to that of the rising water level within the fish lock (67), thus subjecting the fish to no deleterious changes of water pressure. The upward travel of the fish lift (67) is preferably terminated when the upstream edge thereof has reached an elevation substantially that of the sill of the aperture (61). Upon the attainment of equilibrium between the forebay level and the water level within the fish lock, the closure member (62) is manipulated to uncover the aperture (61), establishing open communication between the forebay (5) and the interior of the fish lock (2), permitting egress of the fish therefrom. To provide a definite current of water against which the fish can proceed, the tainter valve (22) is slightly opened. This causes a flow of water from the fish lock (2) into the well (24), and a corresponding flow of water from the forebay (5) into the fish lock (2).

After the fish have departed from the fish lock, the closure member (62) is manipulated to seal the aperture (61), after which the tainter valve (22) is further opened, lowering the water level within the fish lock (2), to coincide with the level of that in the entry bay. Concurrently therewith, the fish lift (67) is lowered to its initial position, bringing the fish trap structure (75) into alignment with the aperture (53). The tainter valve (22) is then closed, the closure member (54) is removed from the aperture (53), and the tainter valve (9) is opened sufficiently to provide a flow of water for lure purposes through the aperture (53) into the entry bay (4).

A substantially identical procedure is effected in the operation of the fish lock (3), the cycle of operations of the two locks being preferably so timed that during the interval that either of them is in the operative position for receiving migrating fish from the entry bay (4), the other is being subjected to the operations of placing the closure member over the downstream aperture, filling with water, elevating the fish lift, releasing the entrained fish, returning the fish lift to its initial position, discharging the water to entry bay level, removing the closure member from the downstream aperture, and establishing the flow of lure water therefrom. The first named fish lock then enters upon a cycle of similar operations, the two fish locks alternating in such a manner that, normally, at least one of them is in position to receive fish at any instant.

The flow of water, both discharge and operative, from the fish locks (2) and (3) into the entry bay (4) may require augmentation to provide a flow adequate to attract migratory fish thereto. Such additional water may be taken from the forebay (5) into the well (24) via aperture (40), past tainter valve (39), into tainter valve pit (38), and through aperture (37). The baffle (42) serves to retard the velocity of flow of water thereagainst, and the stepped crest (43) thereof serves to divert a major portion of the water flowing from the well (24) to the conduit (45), the remaining water flowing through the conduit (46).

Having described my invention, what I claim as new and wish to secure by Letters Patent is:

1. In a dam structure of the character described the combination with a fish lock in gate controlled communication with a forebay and a tailrace; of means to deliver water from the forebay into the fish lock under conditions of regulated water flow, a water chamber, means to discharge the water content of the fish lock into the water chamber under conditions of regulated water flow, means to deliver an auxiliary water supply from the forebay to the chamber under conditions of regulated water flow, and means for directing the water content of the water chamber into the tailrace at a point remote with respect to the gate controlled communication between the fish lock and the tailrace.

2. In a dam structure of the character described the combination with a fish lock, in gate controlled communication with a forebay and a tailrace; of means to deliver water from the forebay into the fish lock under conditions of regulated flow, a water chamber, means to discharge the water content of the fish lock into the water chamber under conditions of regulated flow, means to deliver an auxiliary water supply from the forebay into the water chamber under conditions of regulated flow, baffle means in the water chamber intercepting the path of the auxiliary water supply, and means in connection with the water chamber for delivering its water content to the tailrace at a point remote with respect to the gate controlled communication between the fish lock and the tailrace.

3. In a dam structure the combination with a fish lock in gate controlled communication with a forebay and a tailrace; of means to deliver water to the fish lock from the forebay under conditions of regulated flow, a water chamber, means to deliver the auxiliary supply of water to the water chamber under conditions of regulated flow, baffling means in the water chamber and arranged in the path of the auxiliary water supply, said baffling means being formed to divert the water along a predetermined path, additional means in connection with the water chamber to direct the water therefrom to a point remote with respect to the gate controlled communication between the fish lock and the tailrace, and means to discharge the water content of the fish lock into the water chamber under conditions of regulated flow.

4. In a dam structure of the character described, the combination with a fish lock in gate controlled communication with a forebay and a tailrace; of means to deliver water from the forebay into the fish lock under conditions of regulated water flow, coacting means in connection with the bottom of the fish lock to distribute and diffuse the water entering said lock, so as to prevent the formation of eddy currents, a water chamber, means to discharge the water content of the fish lock into the water chamber under conditions of regulated water flow, means to deliver an auxiliary water supply from the forebay to the water chamber under conditions of regulated water flow, and means for directing the water content of the water chamber into the tailrace at a point remote with respect to the gate controlled communication between the fish lock and the tailrace.

5. In a dam structure of the character described, the combination with a fish lock in gate controlled communication at its opposite ends with a forebay and a tailrace; of means to deliver water from the forebay into the fish lock under conditions of regulated water flow, means in connection with the bottom of the fish lock and coacting with the water entering said lock to distribute and diffuse said water so as to avoid the formation of eddy currents; a water chamber, means to discharge the water content of the fish lock into the water chamber under conditions of regulated flow; means to deliver an auxiliary water supply from the forebay into the water chamber under conditions of regulated water flow; baffle means in the water chamber intercepting the path of the auxiliary water supply and means in connection with the water chamber for delivering its water content to the tailrace at a point remote with respect to the gate controlled communication between the fish lock and the tailrace.

6. In a dam structure of the character described, the combination with a pair of fish locks in gate controlled communication at their opposite ends with a forebay and a tailrace; of means to deliver the water from the forebay into the fish locks under conditions of regulated water flow, a water chamber common to both fish locks, means to discharge the water content of the fish locks into the water chamber under conditions of regulated water flow; means to deliver an auxiliary water supply from the forebay to the water chamber under conditions of regulated water flow, means for directing the water content of the water chamber into the tailrace at a point remote with respect to the gate controlled communication between the fish lock and the tailrace.

7. In a dam structure of the character described, the combination with a pair of fish locks in gate controlled communication with a forebay and a tailrace; of means to deliver water from the forebay into the fish locks under conditions of regulated water flow, means in the bottom of each of said fish locks and coacting with the entering water to distribute and diffuse the latter so as to avoid the formation of eddy currents; a water chamber common to both fish locks, means to discharge the water content of the fish locks into the water chamber under conditions of regulated water flow; means to deliver an auxiliary water supply from the forebay to the water chamber under conditions of regulated water flow and means for directing the water content of the water chamber into the tailrace at a point remote with respect to the gate controlled communication between the fish lock and the tailrace.

8. In a dam structure of the character described, the combination with a pair of fish locks in gate controlled communication with a forebay and a tailrace; of means to deliver water from the forebay into the fish locks under conditions of regulated water flow, a water chamber common to both fish locks, means to discharge the water content of the fish locks into the water chamber under conditions of regulated water flow; means to deliver an auxiliary water supply from the forebay into the water chamber under conditions of regulated water flow; baffle means in the water chamber intercepting the path of the auxiliary water supply and means in connection with the water chamber for delivering the water content to the tailrace at a point remote with respect to the gate controlled communication between the fish locks and the tailrace.

9. In a dam structure of the character described, the combination with a pair of fish locks in gate controlled communication with a forebay and a tailrace; of means to deliver water from the forebay into the fish locks under conditions of regulated water flow, a water chamber common to the two fish locks, means to discharge the water content of the fish locks into the common water chamber under conditions of regulated water flow; means to deliver an auxiliary water supply from the forebay into the water chamber under conditions of regulated water flow; baffle means in the water chamber intercepting the path of the auxiliary water supply said baffle means including a dispersion wall situated centrally of the chamber and a series of baffles spaced from and arranged in angular relation with respect to said dispersion wall and means in connection with the water chamber for delivering its water content to the tailrace at a point remote to the gate controlled communication between the fish locks and the tailrace.

BEN L. PETERSON.